R. F. FORKNER AND A. STRAIGHTIFF.
REMOVABLE WRIST PIN BEARING.
APPLICATION FILED JULY 23, 1920.
1,375,142.
Patented Apr. 19, 1921.
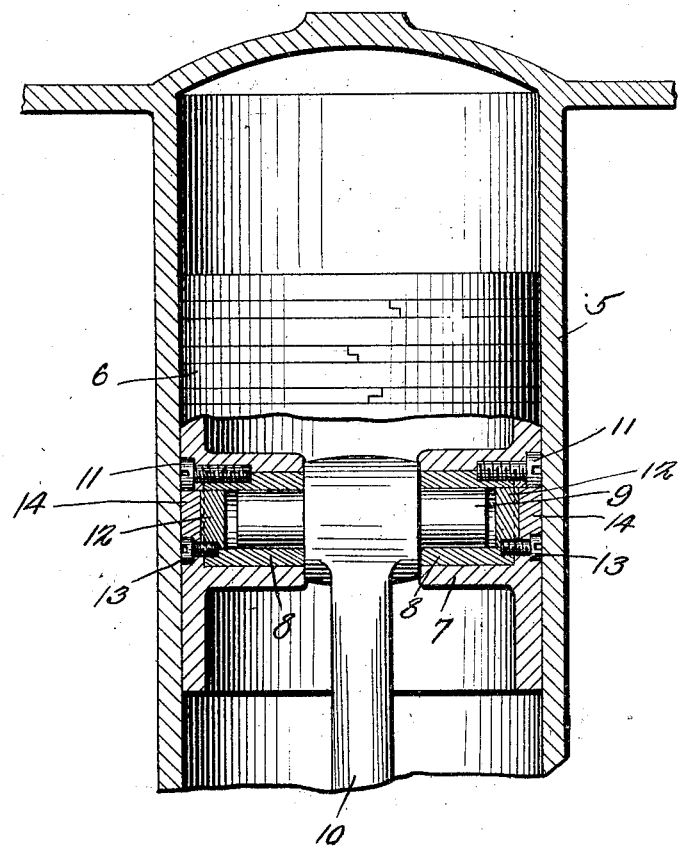

UNITED STATES PATENT OFFICE.

ROBERT F. FORKNER, OF PRINCETON, WEST VIRGINIA, AND ALEXANDER STRAIGHTIFF, OF ROANOKE, VIRGINIA.

REMOVABLE WRIST-PIN BEARING.

1,375,142.

Specification of Letters Patent. Patented Apr. 19, 1921.

Application filed July 23, 1920. Serial No. 398,451.

*To all whom it may concern:*

Be it known that we, ROBERT F. FORKNER and ALEXANDER STRAIGHTIFF, citizens of the United States, respectively residing at Princeton and Roanoke, in the counties of Mercer and Roanoke, States of West Virginia and Virginia, have invented a new and useful Removable Wrist-Pin Bearing, of which the following is a specification.

This invention relates to internal combustion engines, and more particularly to the bearing construction associated with the wrist pins employed for connecting the connecting rods to the pistons.

The primary object of the invention is to provide a bearing of this character to permit the wrist pin to float and at the same time provide a bearing which may be readily and easily replaced, in the event that the same becomes worn beyond use.

A further object of the invention is to provide a thrust bearing associated with each end of the wrist pin, for restricting the lateral thrust thereof.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing the figure illustrates a longitudinal sectional view through a cylinder disclosing a piston therein, the piston being broken away to illustrate the wrist pin.

Referring to the drawing in detail, the reference character 5 designates the cylinder of an internal combustion engine, and which is of the usual construction, the piston indicated by the reference character 6 being shown as positioned within the cylinder to operate therein.

The piston 6 is provided with the usual bearing supports, indicated at 7 and in which are supported the tubular bearings indicated at 8 in which bearings is mounted the wrist pin 9 that connects the connecting rod 10 with the piston 6.

The walls of the bearing supporting members 7 are threaded to accommodate the threaded portion of the securing screws 11, which screws also coöperate with threaded portions of the bearings 8, for securing the bearings within the supporting members.

Disposed adjacent to the ends of the wrist pin 9, are the thrust bearings 12 which are of diameters less than the interior diameters of the bearings 8 to permit the same to be readily and easily positioned within the bearings 8, the thrust bearings being provided however to restrict lateral movement of the wrist pin 10 with relation to the connecting rod associated therewith.

A securing screw indicated at 13 coöperates with each of the thrust bearings 12 for securing the thrust bearings against displacement, the thrust bearings being shown as spaced from the ends of the wrist pin to allow of movement of the wrist pin laterally within its bearings, to provide for the floating of the wrist pin.

Positioned in the outer ends of the bearing supporting members 7, are the plugs 14 which abut the thrust bearings 12 to secure the bearings 12 against lateral movement in one direction, the securing screws 13 contacting with the plugs 14 to prevent displacement thereof.

From the foregoing it is obvious that due to the construction as described, the bearings may be readily and easily removed and replaced, and the wrist pin 9 will be permitted to move laterally within its bearings, to change the wear surface of the wrist pin, to increase the life of the wrist pin and the bearings.

Having thus described the invention, what is claimed as new is:—

1. In combination with a piston and the connecting rod associated therewith, bearing supporting members forming a part of the piston, tubular bearing members disposed within the bearing supporting members, a wrist pin positioned in the bearings, thrust bearings disposed adjacent to the outer ends of the tubular bearings, and means for securing the bearings within the bearing supporting members.

2. In combination with a piston and the connecting rod associated therewith, bearing supporting members forming a part of the piston, tubular bearings supported within the bearing supporting members, a thrust bearing fitted in one end of each of the tubular bearings, a wrist pin disposed in the bearings, threaded means extending through the piston and coöperating with the bearings for securing the bearings against movement, and said wrist pin having its ends spaced from the thrust bearings.

In testimony that we claim the foregoing as our own, we have hereto affixed our signatures in the presence of two witnesses.

ROBERT F. FORKNER.
ALEXANDER STRAIGHTIFF.

Witnesses:
G. E. AKERS,
D. N. AKERS.